US012742717B2

(12) United States Patent
Lu

(10) Patent No.: US 12,742,717 B2
(45) Date of Patent: Sep. 22, 2026

(54) PARTICLE DETECTION METHOD, ELECTRONIC DEVICE, AND STORAGE MEDIUM

(71) Applicant: TRIPLE WIN TECHNOLOGY(SHENZHEN) CO. LTD., Shenzhen (CN)

(72) Inventor: Jyun-Hong Lu, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 387 days.

(21) Appl. No.: 18/372,371

(22) Filed: Sep. 25, 2023

(65) Prior Publication Data

US 2024/0302261 A1 Sep. 12, 2024

(30) Foreign Application Priority Data

Mar. 10, 2023 (CN) ......................... 202310264900.6

(51) Int. Cl.
*G01N 15/02* (2024.01)
*G01N 15/0227* (2024.01)
*G06T 7/507* (2017.01)

(52) U.S. Cl.
CPC ......... *G01N 15/0227* (2013.01); *G06T 7/507* (2017.01); *G06T 2207/20182* (2013.01)

(58) Field of Classification Search
CPC ........... G01N 15/0227; G01N 15/1433; G01N 2015/0046; G06T 7/507; G06T 2207/20182; G06T 7/70; G06T 2207/20081; G06T 2207/20084; G06T 2207/20224; G06T 2207/30168; G06T 5/70; G06T 7/62; G06T 7/0004; G06T 2207/10056; G06V 10/764
See application file for complete search history.

(56) References Cited

U.S. PATENT DOCUMENTS

2016/0216195 A1* 7/2016 Grier .................. G01N 15/1429
2017/0350800 A1* 12/2017 Dahlqvist .......... G01N 15/0211
2024/0085299 A1* 3/2024 Westcott ............ G01N 15/0227

FOREIGN PATENT DOCUMENTS

CN 101231161 A * 7/2008
CN 102722706 A * 10/2012

* cited by examiner

*Primary Examiner* — Oneal R Mistry
*Assistant Examiner* — Jongbong Nah
(74) *Attorney, Agent, or Firm* — ScienBiziP, P.C.

(57) ABSTRACT

Disclosed in the present invention are a particle detection method, an electronic device, and a storage medium. The particle detection method includes obtaining a detection image; identifying an imaging of a particle in the detection image and obtaining a shadow region of the particle; determining a maximum influence degree of the particle based on an influence degree of each pixel point in the shadow region; and obtaining size information of the particle based on the maximum influence degree of the particle. The present disclosure can distinguish the particles of different sizes, thereby accurately calculating the size of the particle and improving the accuracy of the particle detection.

9 Claims, 15 Drawing Sheets

PARTICLE DETECTION METHOD, ELECTRONIC DEVICE, AND STORAGE MEDIUM

FIELD

The present disclosure relates to the technical field of cameras, in particular to a particle detection method, an electronic device, and a storage medium.

BACKGROUND

A camera module usually includes a lens, a filter lens, and a sensor. The filter lens may be a blue glass, the light enters the lens, passes through the filter lens, and is projected onto the sensor to form an image. In the assembly process of the camera module, there may be dust, impurities and other particles attached to the filter lens, and the light entering the lens will form a shadow in the sensor after passing through the particles, thereby affecting the light-gathering effect and imaging quality of the camera module. Therefore, in the quality control of a camera module production line, and the size of the particles in the camera module are usually detected, and the results of the detection are used to assess the presence of defective products in the production line.

A particle detection method is to use a camera module to capture an image of a light equalizing plate, identify the shadow formed by the projection of the particles in the image, and calculate influence degree of all the pixel points within the shadow, and then filter out the pixel points within the shadow whose influence degree is greater than a predetermined threshold, and use the shadow area occupied by this part of the pixel points to convert a size of the particles. However, the accuracy of the particle detection method is very low.

Therefore, improvement is desired.

DETAILED DESCRIPTION

In order to make the technical solutions of the embodiments of the present disclosure clearer, the technical solutions in the embodiments of the present disclosure will be described clearly and completely in the following in conjunction with the accompanying drawings in the embodiments of the present disclosure, and it is obvious that the described embodiments are a part of the embodiments of the present disclosure and not all of the embodiments.

In the description of the present disclosure, the terms "first", "second" are only used to distinguish the purpose of the description and cannot be understood as indicating or implying relative importance, nor can they be understood as indicating or implying order.

In the description of embodiments of the present disclosure, the words "for example" are used to denote an example, illustration, or description, any embodiment described as "for example" in the embodiments of the present disclosure should not be construed as being preferred or advantageous over other embodiments.

Figure 1:
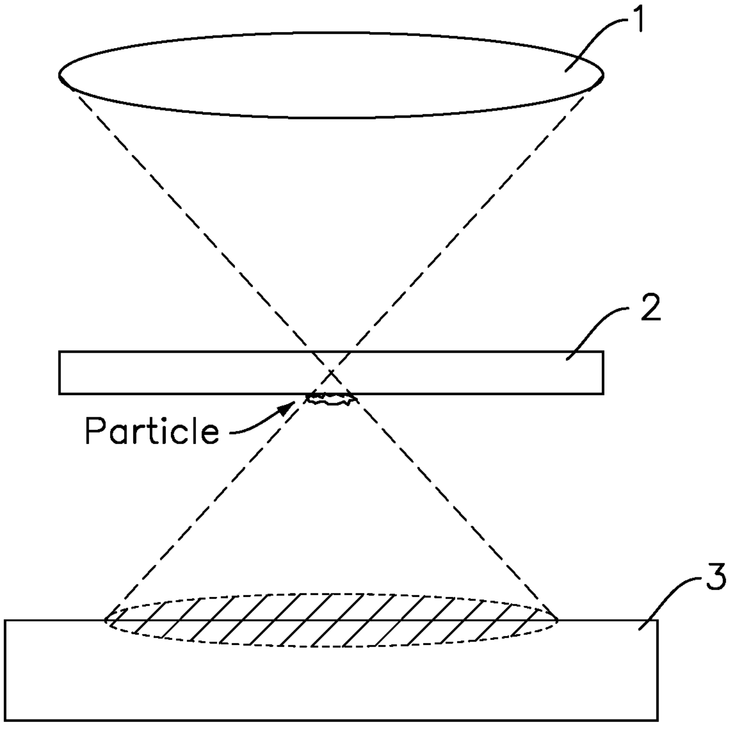
FIG. 1 is a schematic diagram of a camera module according to an embodiment of the present disclosure.

As shown in FIG. 1, a camera module includes a lens 1, a filter lens 2, and a sensor 3. The filter lens 2 may be a blue glass, the light enters the lens 1, passes through the filter lens 2, and is projected onto the sensor 3 to form an image. If the particles (such as dust or impurities) adhere to a surface of the filter lens 2, after passing through particles, the light forms a shadow in the sensor 3, this results in clumps of the shadow in the image captured by the camera module, which affects the lighting effect and image quality of the camera module. Therefore, in the quality control of a camera module production line, and the size of the particles in the camera module are usually detected, and bad camera modules with particle sizes exceeding a preset threshold are intercepted.

A particle detection method is to use a camera module to capture an image of a light equalizing plate, identify the shadow formed by the projection of the particles in the image, and calculate the influence degree of all the pixel points within the shadow, and then filter out the pixel points within the shadow whose influence degree is greater than a predetermined threshold, and use the shadow area occupied by this part of the pixel points to convert a size of the particle.

The influence degree of the pixel point refers to the influence degree of the pixel point relative to a background value of the light equalizing plate. For example, the calculation of the influence degree may be as follows: spatially filtering the image by a first filtering parameter to obtain a first image that filters out the noise but retains particulate shadow, and spatially filtering the image by a second filtering parameter to obtain a second image that averages out both the noise and the particulate shadow; calculating a difference of each pixel point in the shadow between a gray value of a first image and a second image; and calculating a percentage between the difference of the pixel point and the gray value of the second image in the pixel point, to obtain the influence degree of the pixel point. The particle detection method applies the influence degree of the pixel point in the shadow to better distinguish between the pixel point in the particle shadow and the pixel point in non-particle shadow.

However, when there is a shadow of particle projection imaging in an image, due to the linear propagation of light, the gray value of each pixel point in the shadow has a tendency to become weaker in the direction of approaching the center of the shadow to moving away from the center of the shadow, and it is difficult for ordinary algorithms to detect the pixel points at the edge portion of the shadow in a complete manner.

Therefore, the above particle detection method does not directly treat all shadows as projections of particles, but rather sets the region of the shadow with a certain degree of difference within the error allowable range, and frames out the pixel points whose influence degree exceeds a preset threshold, with the purpose of retaining a certain degree of detection error, and reducing the inclusion of the pixel point that are not projections of the particles in the computation of the area of the shadow.

Figure 2:
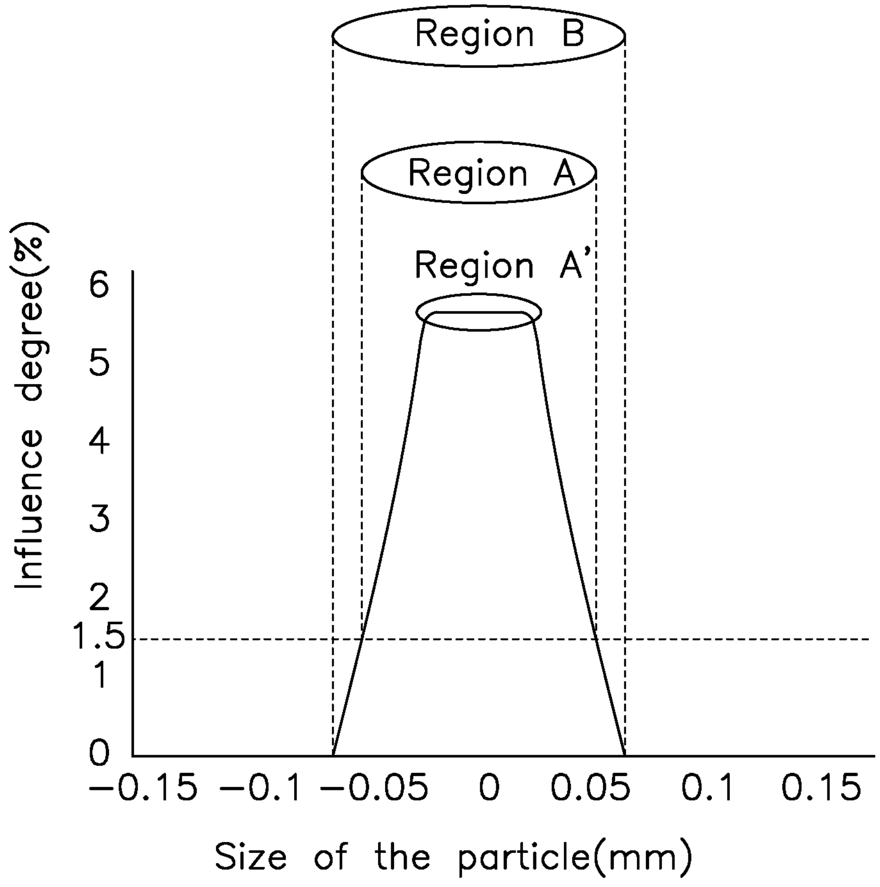
FIG. 2 shows a relationship between a diameter of a shadow and influence degree of each pixel point in the shadow in an image obtained statistically from experimental data according to an embodiment of the present disclosure.

FIG. 2 shows a relationship between a diameter of a shadow and influence degree of each pixel point in the shadow of an image.

The shadow illustrated in FIG. 2 is formed by the projection of a particle with a size of 60 um, and the data related to the diameter of the shadow and the influence degree are the results of experimental data statistics. The diameter of the shadow can be regarded as a distance from the pixel point to the center of the shadow, and the influence degree of each pixel point has a tendency to become weaker in the direction of approaching the center of the shadow to moving away from the center of the shadow.

In the above particle detection method, assuming that the preset threshold is 1.5%, a region A formed by the pixel points with an influence degree greater than or equal to 1.5% is regarded as the shadow of the particles. If the pixel points with an influence degree greater than or equal to 0% forms a region B, it can be seen that the area of the region A is smaller than that the area of the region B.

Figure 3:
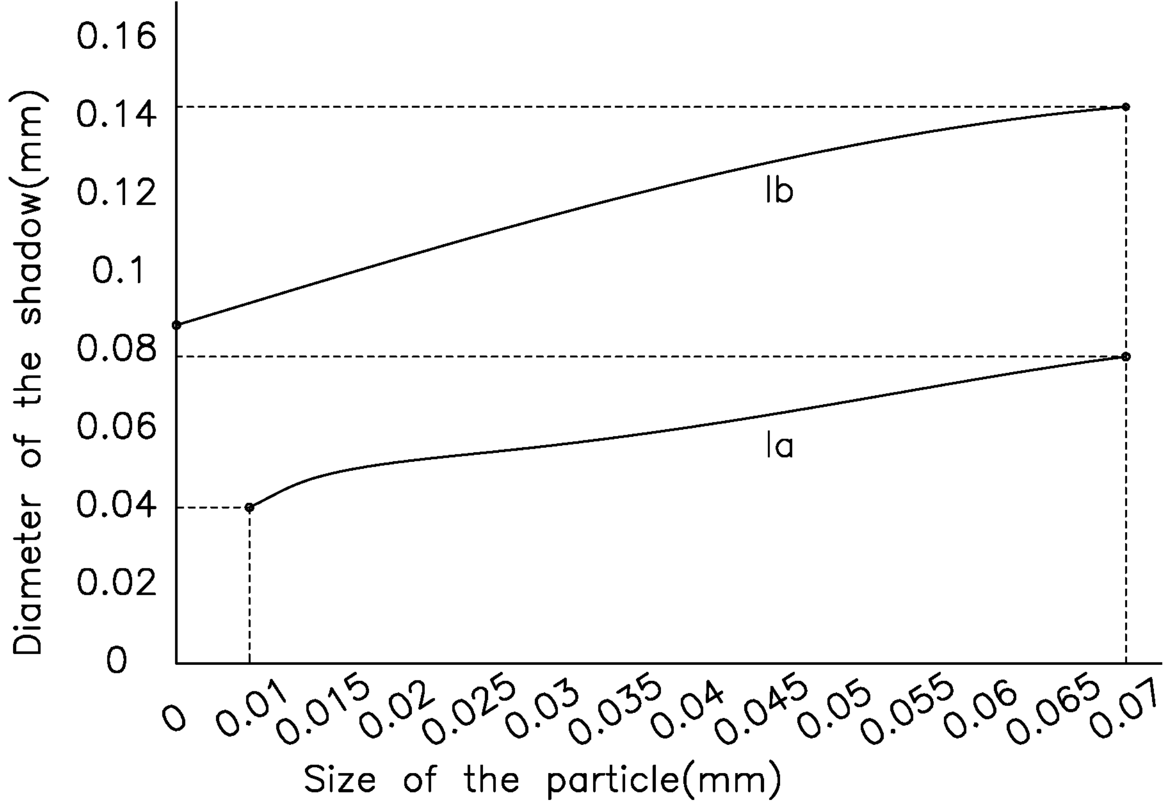
FIG. 3 shows a comparison of a curve of particles of different sizes corresponding to a region A and a region B obtained statistically from experimental data according to an embodiment of the present disclosure.

Furthermore, FIG. 3 shows a comparison of a curve of particles of different sizes corresponding to the region A and the region B.

The curve 1*a* represents a variation curve of the particles of different sizes corresponding to the region A. The curve 1*b* represents a variation curve of the particles of different sizes corresponding to the region B. The curves 1*a* and 1*b* are both obtained through experimental data statistics.

When the size of the particle is 10 um, the diameter of the shadow of the region A is 40 um, and the diameter of the shadow of the region B is 70 um. When the size of the particle is 70 um, the diameter of the shadow of the region A is 80 um, and the diameter of the shadow of the region B is 140 um.

It can be seen that the size of the particle has increased by 7 times from 10 um to 70 um, the diameter of the shadow of region A has only increased by about 2 times, the differences between the corresponding regions A of the particles of different sizes are small and not easily distinguishable.

In summary, the above particle detection method relies on the calculation of the projected shadow area, but the shadow area not only needs to be reduced in the assumed error range, but also the difference in the diameter of the shadow corresponding to the particles of different sizes is small, so that it is not easy to distinguish between the particles of different sizes, so that the above particle detection method suffers from the defect of low accuracy.

The embodiment of the present disclosure provides a particle detection method, a particle detection system, an electronic device, and a computer storage medium. The present disclosure can accurately calculate the size of the particle and improve the accuracy of particle detection.

Figure 4:
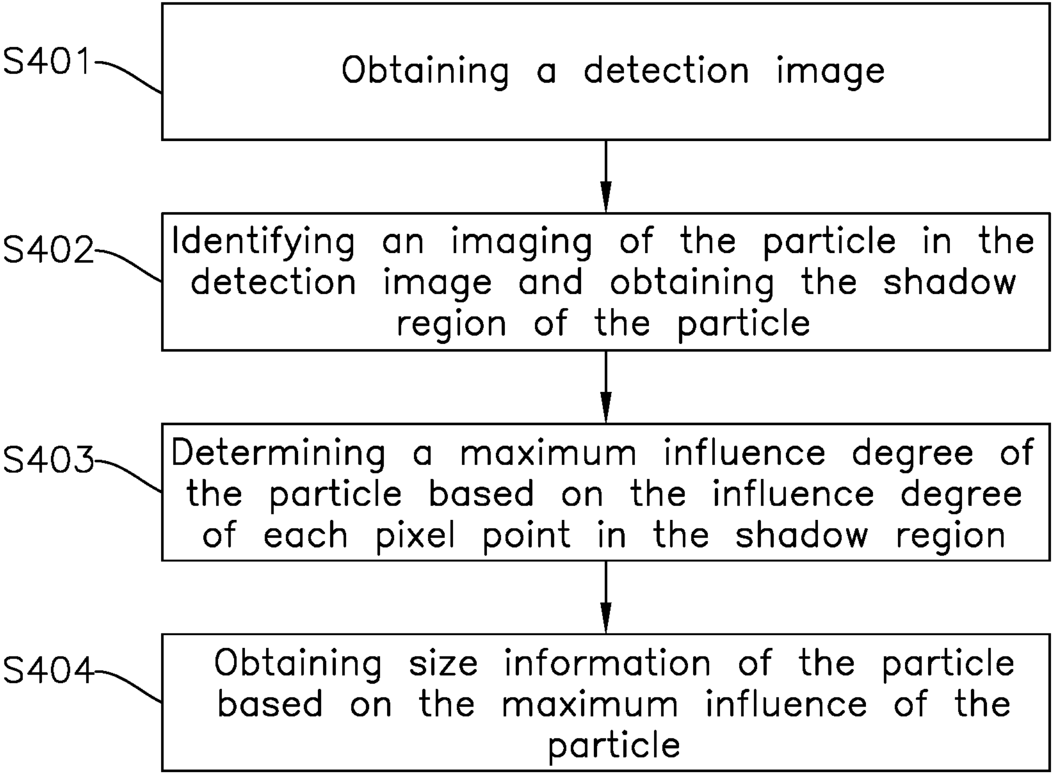
FIG. 4 is a flowchart of a particle detection method according to an embodiment of the present disclosure.

FIG. 4 is a flowchart depicting an embodiment of a particle detection method. In the embodiment, the particle detection method includes the following steps:

At step S401, obtaining a detection image.

The detection image is the image captured by the camera module on a light equalizing plate.

When the particle is attached to the surface of the filter lens 2 in the camera module, there will be shadows projected by the particle in the detection image.

In the embodiment, the filter lens 2 may be a blue glass.

At step S402, identifying the imaging of the particle in the detection image and obtaining the shadow region of the particle.

The present disclosure uses a preset particle recognition algorithm to identify and label the imaging of the particle in the detection image and obtains the shadow region of the particle.

In the embodiment, when multiple particles are detected in the image, multiple shadow regions corresponding to each particle are identified, and different particles and corresponding shadow regions are labeled and distinguished separately.

At step S403, determining a maximum influence degree of the particle based on the influence degree of each pixel point in the shadow region.

The maximum influence degree of the particle is the maximum value of the influence degree of each pixel point in the shadow region.

After calculating the influence degree of each pixel point in the shadow region of the particle, a numerical comparison is performed on the influence degree of each pixel point, and the maximum value is taken as the maximum influence degree of the particle.

At step S404, obtaining size information of the particle based on the maximum influence degree of the particle.

The size information is the diameter of the particle. In some embodiments, the size information can be the particle area obtained by converting the diameter of the particle.

Figure 5:
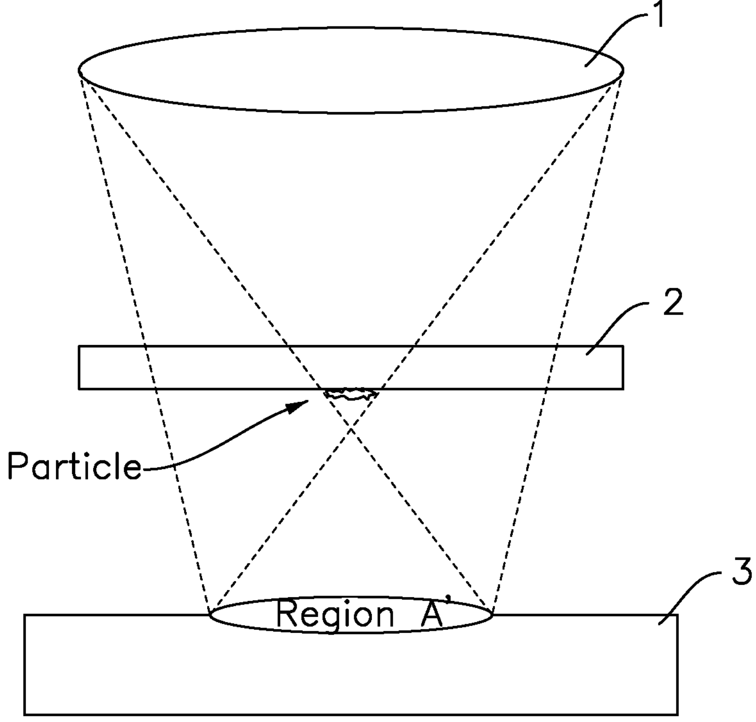
FIG. 5 is a schematic diagram of a plateau region in the shadow of the particles according to an embodiment of the present disclosure.

As shown in FIG. 2 and FIG. 5, during the process of light passing through the filter lens 2 and entering the photosensitive element, the light first gathers into a small aperture on the filter lens 2, and finally gathers into a spot on the photosensitive element, as long as the particle is within the small aperture, a plateau region A' will be formed in the shadow region generated by the particle. The plateau region A' is usually located at the center of the shadow region, and the plateau region A' includes some pixels with a significant influence degree, which is related to the size information of particles. Since the detection image in the embodiment of the present disclosure is taken of the light equalizing plate, all particles produce a plateau region.

Figure 6:
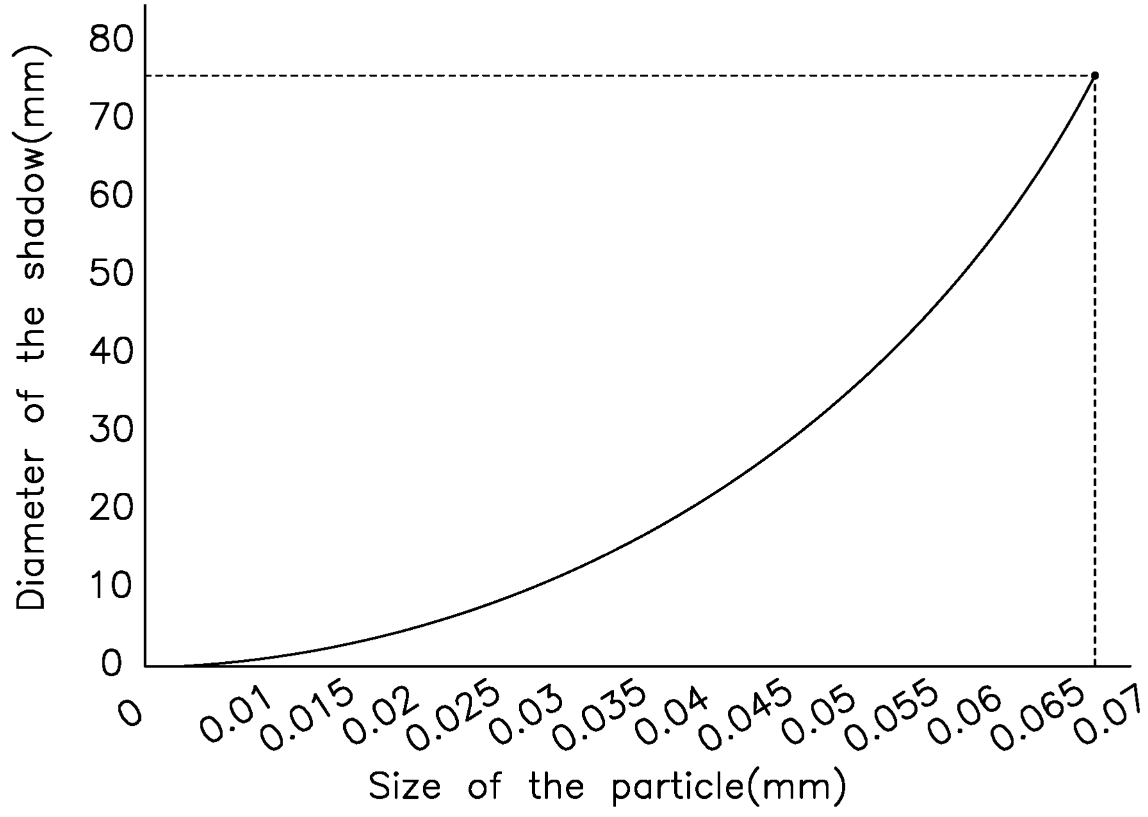
FIG. 6 shows a comparison between the influence degree of each pixel point in the shadow region of a first particle and the influence degree of each pixel point in the shadow region of a second particle obtained statistically from experimental data according to an embodiment of the present disclosure.

FIG. 6 shows a comparison between the influence degree of each pixel point in the shadow region of a first particle and the influence degree of each pixel point in the shadow region of a second particle. The first particle has a diameter of 10 um and the second particle has a diameter of 15 um.

As shown in FIG. 6, the distribution pattern of each pixel point in the shadow region of the first particle is such that each pixel point with a greater influence degree is located close to the center of the shadow region, and the maximum influence degree of the first particle is about 1.56%. The distribution pattern of each pixel point in the shadow region of the second particle is such that each pixel point with a greater influence degree is located close to the center of the shadow region, and the maximum influence degree of the second particle is about 3.5%.

FIG. 6 shows the variation curves of the maximum influence degree in corresponding to different sizes of the particles.

When the size of the particle is 10 um, the maximum influence degree of the particle is about 1.56%. When the size of the particle is 70 um, the maximum influence degree of the particles is about 76.56%.

Comparing FIG. 3 and FIG. 6, it can be seen that there is not only a certain correlation between the maximum influence degree of the particles and the size information of the particles, but also, with the change of the size information of the particles, the maximum influence degree of the different particles varies more. For example, the size of the particles has increased by 7 times from 10 um to 70 um, while the maximum influence degree has increased by tens of times, large differences between the maximum impacts corresponding to the particles of different sizes make it easier to differentiate between the particles of different sizes.

Therefore, there is a correlation between the maximum influence degree of the particle and the size information of the particle. In the same camera module, as the size of the particles gradually increases, the maximum influence degree of the particles also has a tendency to gradually increase, then the maximum influence degree of the particles can be used to calculate, and the particle size information can be obtained.

Figure 7:
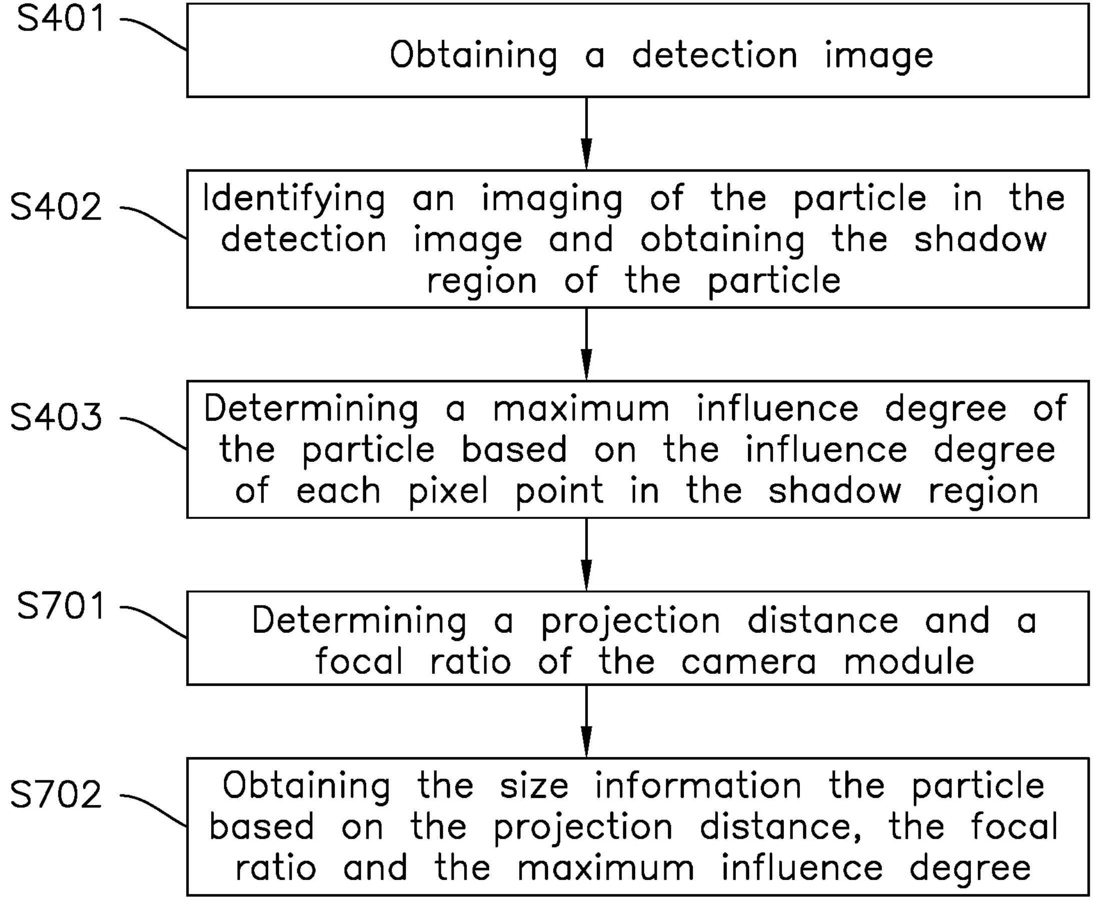
FIG. 7 is a first flowchart of the particle detection method according to an embodiment of the present disclosure.

Referring to FIG. 1 and FIG. 7, in one embodiment, step S404 may include the following steps:

At step S701, determining a projection distance and a focal ratio of the camera module.

The projection distance is a distance between the sensor 3 and the filter lens 2 in the camera module. The focal ratio (also known as F-ratio) is a ratio of the focal length to the aperture, which can also be an aperture value.

The projection distance and the focal ratio are both structural parameters of the camera module, which can be set according to the structure of the camera module. It is to be understood that different camera modules may have different projection distances and focal ratios, and when the particle detection is performed for different camera modules, calculations are required based on the projection distances and the focal ratios corresponding to the camera modules.

At step S702, obtaining the size information the particle based on the projection distance, the focal ratio and the maximum influence degree.

Both the projection distance and the focal ratio affect how the light is imaged in the photoreceptor after it passes through the particles.

In the embodiment, the specific implementation method for obtaining the size information the particle based on the projection distance, the focal ratio and the maximum influence degree is to substitute the projection distance and the focal ratio into formula (1) to obtain the size information.

$$\text{Influence}=(D*F\#/G)^2 \quad (1)$$

Influence is the maximum influence degree, D is the diameter of the particle, G is the projection distance, and F# is the focal ratio.

In some implementations, the specific implementations for obtaining the size information the particle based on the projection distance, the focal ratio and the maximum influence degree may also be:

1) establishing a training dataset. The training dataset includes a training projection distance, a training focal ratio, a training maximum influence degree, and a training size information. The training projection distance is the projection distance of the camera module, the training focal ratio is the focal ratio of the camera module, the training maximum influence degree is the maximum influence degree of a particle captured by the camera module, and the training size information is the size information of the particle.
2) inputting the training dataset into a preset neural network model for training and obtaining the trained particle detection model.
3) inputting the projection distance, the focal ratio, and the maximum influence degree into the particle detection model to obtain the size information of the particle.

The implementation principle of the particle detection method of the present disclosure is as follows: identifying a shadow region in the detection image generated by the projection of the particles, determining the maximum influence degree of the particle based on the influence degree of each pixel point in the shadow region, and then obtaining the size information of the particle using the maximum influence degree of the particle. Large differences between the maximum impacts corresponding to the particles of different sizes make it easier to differentiate between the particles of different sizes, the size of the particle can be calculated more accurately, and the accuracy of the particle detection can be improved.

Figure 8:
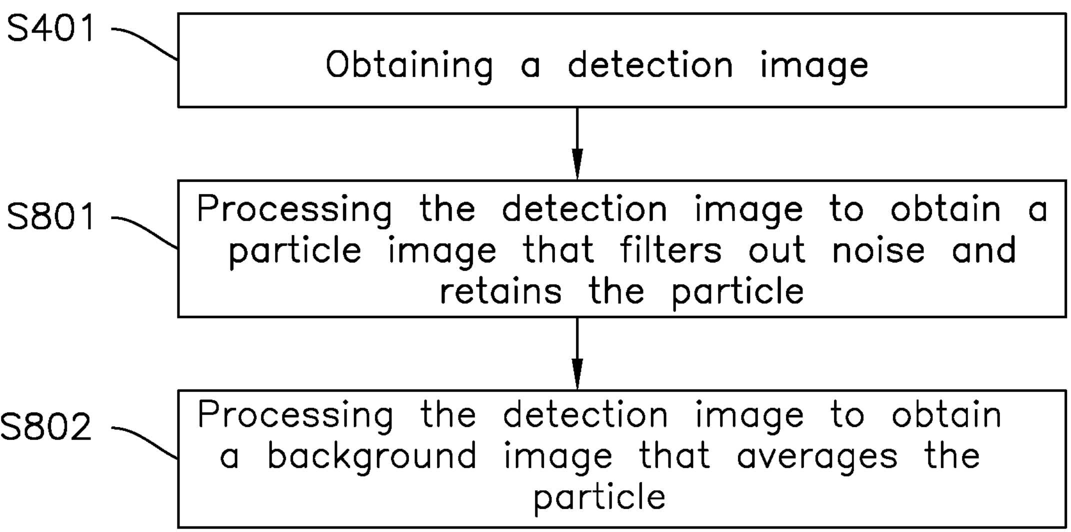
FIG. 8 is a second flowchart of the particle detection method according to an embodiment of the present disclosure.

Referring to FIG. 8, in one embodiment, after step S401, the following steps are also included:

At step S801, processing the detection image to obtain a particle image that filters out noise and retains the particle.

The particle image is spatially filtered through a preset third filtering parameter to obtain an image that filters out noise from the photosensitive components but retains the shadows of the particle.

The particle image can better reflect the imaging shadows of the particles and can be applied to calculate the influence degree on the imaging shadows of the particle, as well as in algorithm recognition of the particle.

At step S802, processing the detection image to obtain a background image that averages the particle.

The background image is spatially filtered through a preset fourth filtering parameter to obtain an image that averages out the noise of the photosensitive element and the shadows of the particle.

The background image can reflect the background value of the light equalizing plate, and the background image can be compared with the particle image to calculate the influence degree on the imaging shadow of the particle.

After executing steps S801 and S802, the influence degree of each pixel point in the detection image can be calculated from the detection image and the background image in subsequent steps.

For example, in a specific embodiment, determining the maximum influence degree of the particle based on the influence degree of each pixel point in the shadow region, can include the following steps:

At step S4031, obtaining the influence degree of each pixel point in the shadow region based on the grayscale values of each pixel point in the shadow region in the particle image and the grayscale values of each pixel point in the background image.

The present disclosure can calculate the difference between the grayscale value of a pixel point in a particle image and the grayscale value of the pixel point in a background image, and then divide the difference by the grayscale value of the pixel point in the background image to obtain the influence degree of the pixel point.

At step S4032, taking the maximum value of the influence degree of each pixel point in the shadow region as the maximum influence degree of the particle.

Figure 9:
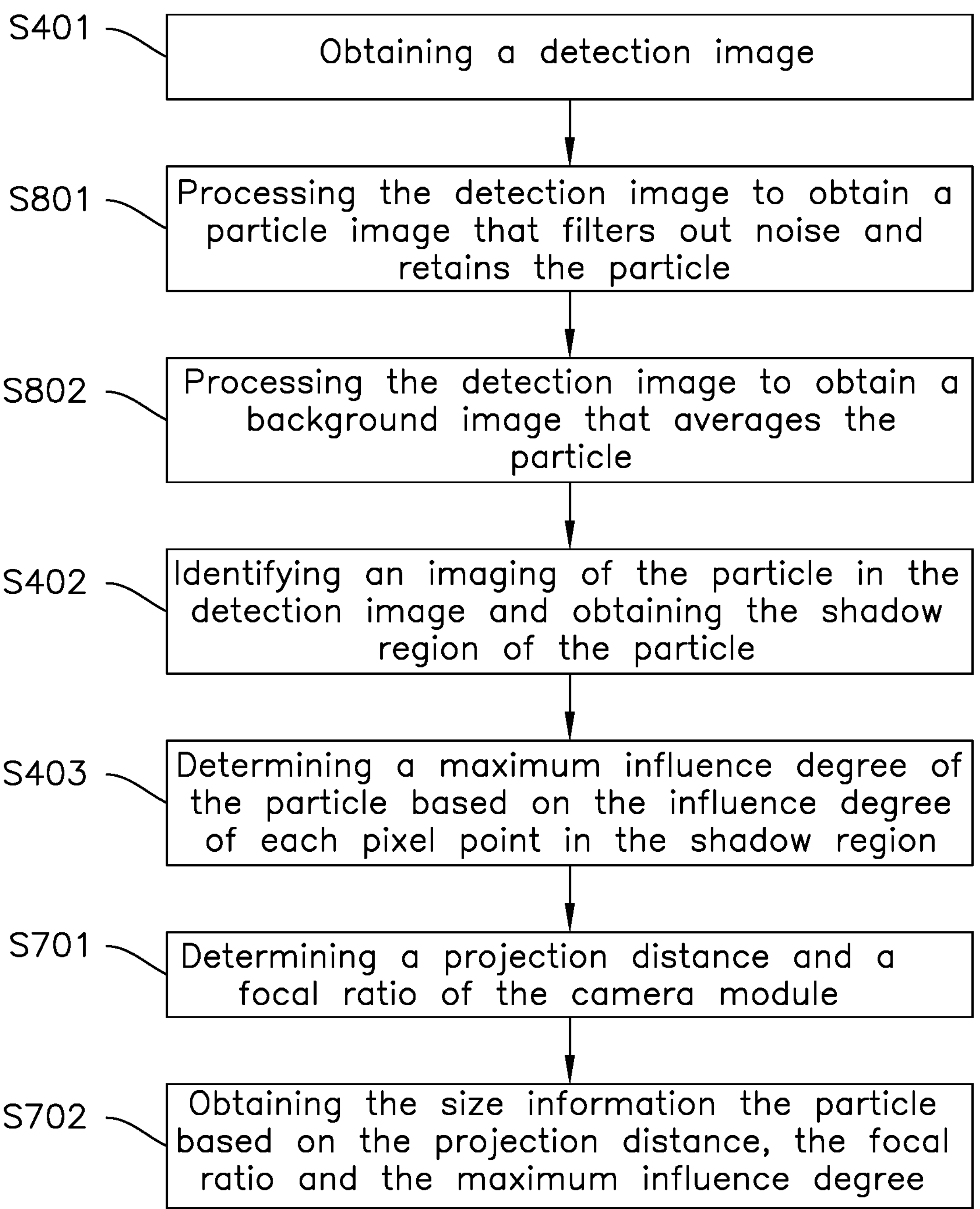
FIG. 9 is a third flowchart of the particle detection method according to an embodiment of the present disclosure.

Referring to FIG. 9, in one embodiment, step S402 is specifically implemented as follows:

Identifying the imaging of the particle in a particle image and obtaining the shadow region of the particle.

The present disclosure identifies and labels the imaging of the particle in the particle image corresponding to the detection image by a particle recognition algorithm and obtains the shadow region of the particle.

Since the particle image can highlight the imaging shadows of the particle, and particle identification on the particle image can identify the shadow region more accurately.

Figure 10:
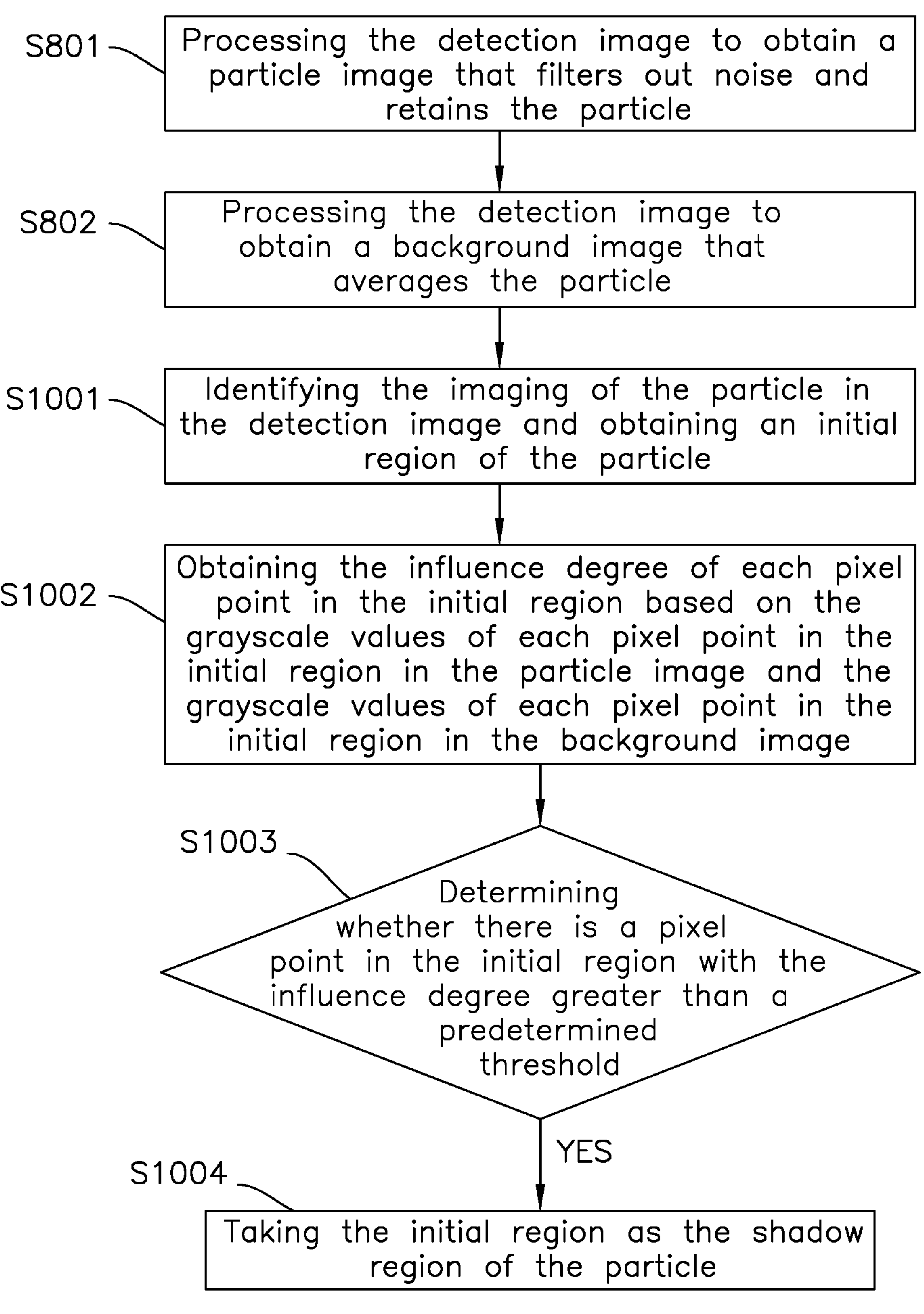
FIG. 10 is a fourth flowchart of the particle detection method according to an embodiment of the present disclosure.

Referring to FIG. 10, in another embodiment, step S402 is specifically implemented as follows:

At step S1001, identifying the imaging of the particle in the detection image and obtaining an initial region of the particle.

The present disclosure uses a particle identification algorithm to identify and label the imaging of the particle in the detection image and obtain the initial region of the particle.

It can be understood that the initial region is the first identified shadow. Subject to the identification capabilities of the particle identification algorithm, it is possible for the particle identification algorithm to identify the non-particle but lightly shaded portion of the detection image as a shadow of a particle. Therefore, the initial region obtained in the initial identification may not necessarily be the shadow of the particle, but also needs to be screened by the following steps.

In one embodiment, step S1001 can also be achieved by identifying and labeling the imaging of the particle in the particle image corresponding to the detection image using a particle identification algorithm, to obtain the initial region of the particle.

At step S1002, obtaining the influence degree of each pixel point in the initial region based on the grayscale values of each pixel point in the initial region in the particle image and the grayscale values of each pixel point in the initial region in the background image.

The present disclosure can calculate the difference between the grayscale value of a pixel in a particle image and the grayscale value of the pixel in a background image, and then divide the difference by the grayscale value of the pixel in the background image to obtain the influence degree of the pixel.

In addition, after executing step S1002, in the subsequent step S403, which determines the maximum influence degree of the particles based on the influence degree of each pixel point in the shadow region, the influence degree of each pixel point in the initial region can also be obtained as the influence degree of each pixel point in the corresponding shadow region of the initial region.

At step S1003, determining whether there is a pixel point in the initial region with the influence degree greater than a predetermined threshold. If there is a pixel point in the initial region with the influence degree greater than a predetermined threshold, step S1004 is implemented, otherwise end.

The preset threshold is a preset threshold for the influence degree, and the preset threshold is used to evaluate whether the initial region is a shadow generated by the particle projection.

When there is a pixel point in the initial region with the influence degree greater than the preset threshold, it indicates that there is a pixel point with a greater influence degree in this initial region. The initial region should be the shadow generated by the particle projection and should be included in the calculation of the size of the particle.

When there is no pixel point in the initial region with the influence degree greater than the preset threshold, it indicates that there is no pixel point with a greater influence degree in this initial region. The initial region may be a shadow generated by non-particle projection that was mistakenly identified and does not need to be included in the calculation of the size of the particle.

At step S1004, taking the initial region as the shadow region of the particle.

The initial region should be the shadow generated by the particle projection and perform step S403 to calculate the size information of the particle.

The present disclosure uses the influence degree of each pixel point in the initial region to evaluate whether the initial region is a shadow generated by the particle projection, which can effectively reduce the probability of misidentification of the particles and improve detection efficiency.

The embodiment of the present disclosure further provides a camera detection method, and the camera detection method includes the steps of the particle detection method mentioned above.

Figure 11:
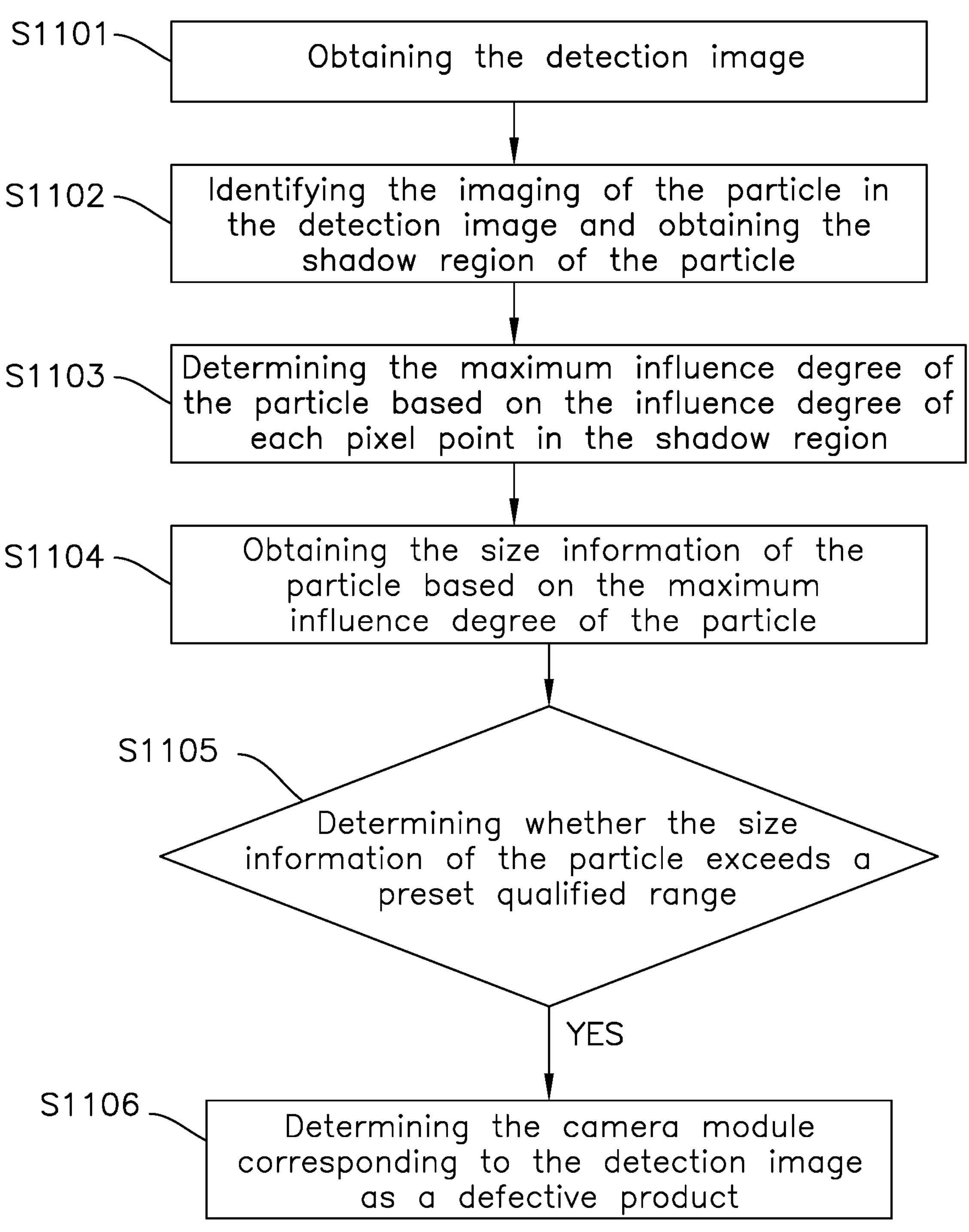
FIG. 11 is a flowchart of a camera detecting method according to an embodiment of the present disclosure.

Referring to FIG. 11, the camera detection method includes the following steps:

At step S1101, obtaining the detection image.

At step S1102, identifying the imaging of the particles in the detection image and obtaining the shadow region of the particle.

At step S1103, determining the maximum influence degree of the particles based on the influence degree of each pixel point in the shadow region.

At step S1104, obtaining the size information of the particle based on the maximum influence degree of the particle.

The implementation principles of steps S1101 to S1104 can be seen in the relevant descriptions of the particle detection methods mentioned above and will not be repeated here.

At step S1105, determining whether the size information of the particle exceeds a preset qualified range. If the size information of the particle exceeds a preset qualified range, step S1106 is implemented, otherwise end.

At step S1106, determining the camera module corresponding to the detection image as a defective product.

When the size information of the particle exceeds the preset qualified range, it indicates that there is large particle in the camera module that captures the detection image, which will have a significant impact on the imaging quality of the camera module. Therefore, the camera module is determined as a defective product, and subsequent repair and inspection of the defective camera module is required.

The camera inspection method of the present disclosure can more accurately detect the size of the particle in the camera module, which can improve the accuracy of the camera quality evaluation, reduce the misjudgment of the camera quality, and reduce the production cost.

The embodiment of the present disclosure further provides a particle detection system, the particle detection system can perform the steps of the particle detection method mentioned above.

Figure 12:
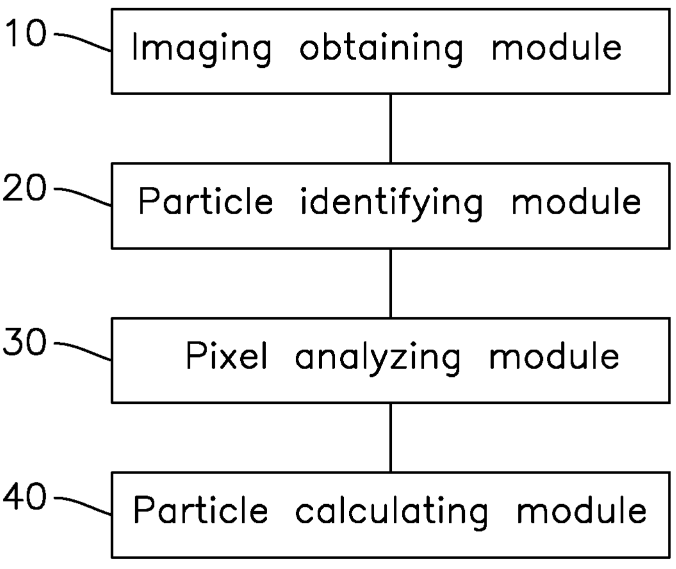
FIG. 12 is a first schematic diagram of a particle detecting system according to an embodiment of the present disclosure.

Referring to FIG. 12, the particle detection system includes an imaging obtaining module 10, a particle identifying module 20, a pixel analyzing module 30, and a particle calculating module 40.

The imaging obtaining module 10 is used for obtaining the detection image.

The particle identifying module 20 is used for identifying the imaging of the particle in the detection image and obtaining the shadow region of the particle.

The pixel analyzing module 30 is used for determining the maximum influence degree of the particles based on the influence degree of each pixel point in the shadow region.

The particle calculating module 40 is used for obtaining the size information of the particle based on the maximum influence degree of the particle.

Figure 13:
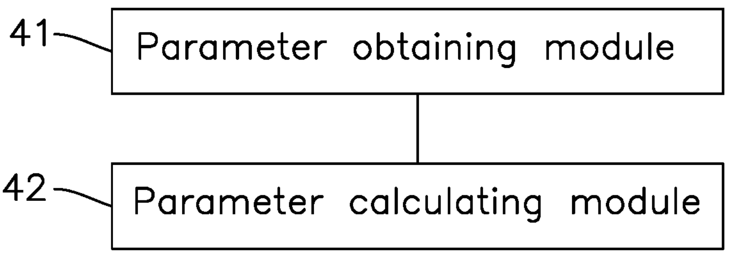
FIG. 13 is a schematic diagram of a particle calculating module according to an embodiment of the present disclosure.

Referring to FIG. 13, in one embodiment, the particle calculating module 40 includes a parameter obtaining module 41 and a parameter calculating module 42.

The parameter obtaining module 41 is used for determining the projection distance and the focal ratio of the camera module. The projection distance is the distance between the photosensitive element and the filter lens 2, and the focal ratio is the ratio of the equivalent focal length to the optical aperture.

The parameter calculating module 42 is used for obtaining the size information of the particle based on the projection distance, the focal ratio, and the maximum influence degree.

Figure 14:
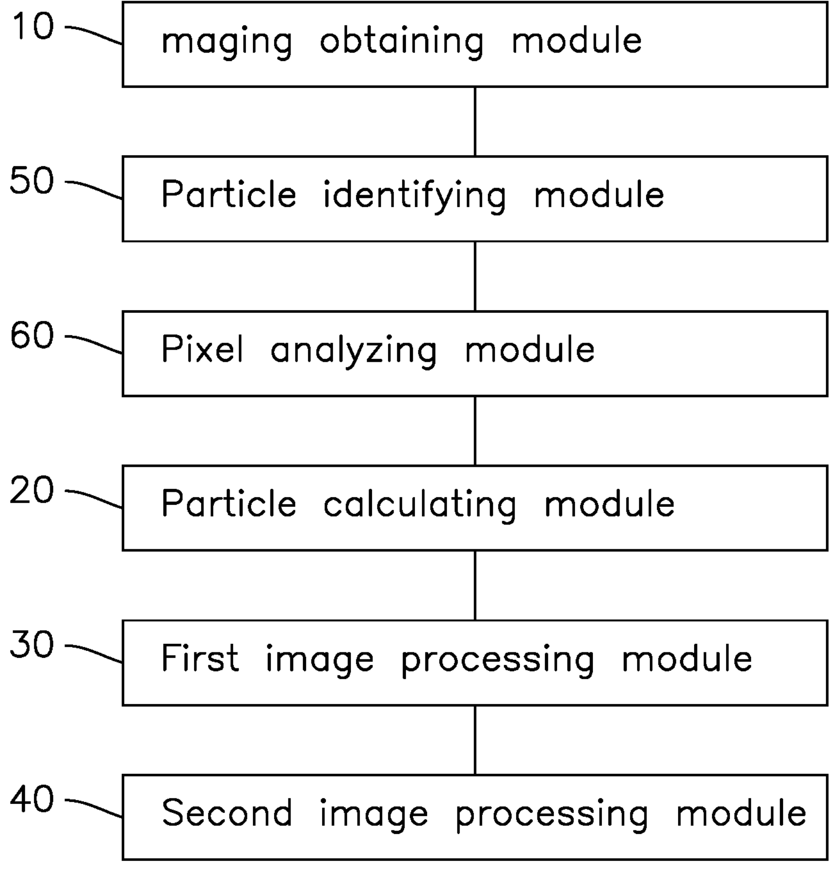
FIG. 14 is a second schematic diagram of the particle detecting system according to an embodiment of the present disclosure.

Referring to FIG. 14, in one embodiment, the particle detection system further includes a first image processing module 50 and a second image processing module 60.

The first image processing module 50 is used for processing the detection image to obtain a particle image that filters out noise and retains the particles.

The second image processing module 60 is used for processing the detection image to obtain a background image that averages the particles.

Figure 15:
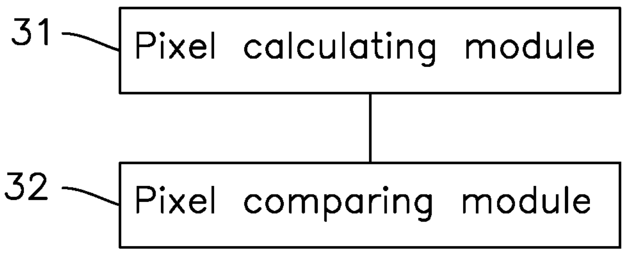
FIG. 15 is a schematic diagram of a pixel analyzing module according to an embodiment of the present disclosure.

Referring to FIG. 15, in one embodiment, the pixel analyzing module 30 includes a first pixel calculating module 31 and a pixel comparing module 32.

The first pixel calculating module 31 is used for obtaining the influence degree of each pixel point in the shadow region based on the grayscale values of each pixel point in the shadow region in the particle image and the grayscale values of each pixel point in the background image.

The pixel comparing module 32 is used for taking the maximum value of the influence degree of each pixel point in the shadow region as the maximum influence degree of the particle.

Figure 16:
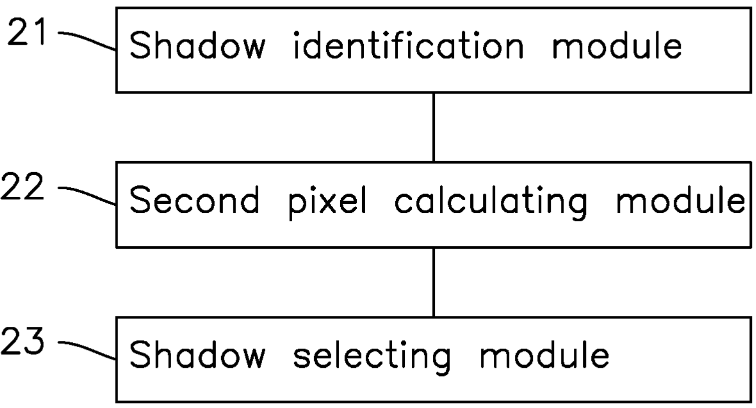
FIG. 16 is a schematic diagram of a particle identifying module according to an embodiment of the present disclosure.

Referring to FIG. 16, in one embodiment, the particle identifying module 20 includes a shadow identification module 21, a second pixel calculating module 22 and a shadow selecting module 23.

The shadow identification module 21 is used for identifying the imaging of the particle in the detection image and obtaining an initial region of the particle.

The second pixel calculating module 22 is used for obtaining the influence degree of each pixel point in the initial region based on the grayscale values of each pixel point in the initial region in the particle image and the grayscale values of each pixel point in the initial region in the background image.

The shadow selecting module 23 is used for taking the initial region as the shadow region of the particle when there is pixel in the initial region with the influence degree greater than a predetermined threshold.

The particle detection system of the present disclosure can achieve the technical effects of the above particle detection method by executing each step of the above particle detection method. The implementation principle of the technical effects can refer to the relevant description of the above particle detection method and will not be elaborated here.

Figure 17:
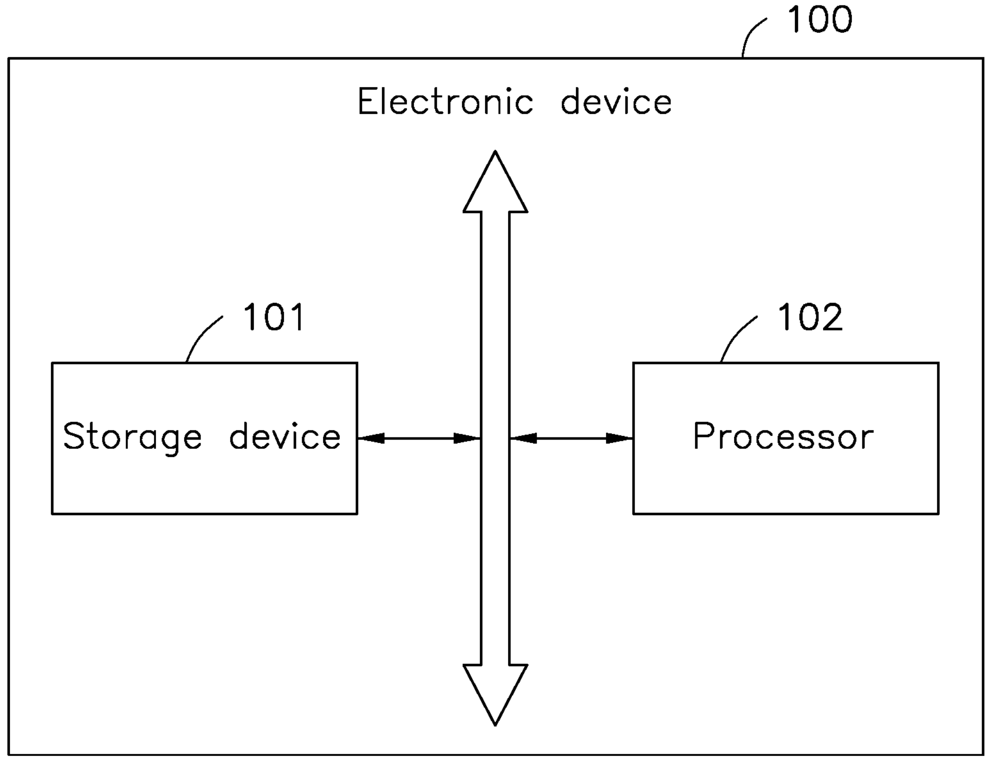
FIG. 17 is a schematic diagram of an electronic device according to an embodiment of the present disclosure.

FIG. 17 illustrates an electronic device 100 in accordance with an embodiment of the present disclosure.

In one embodiment, the electronic device 100 includes a storage device 101 and at least one processor 102. Those skilled in the art should understand that the structure of the electronic device 100 shown in FIG. 17 does not constitute a limitation of the present disclosure. The electronic device 100 may also include other components.

In some embodiments, the electronic device 100 includes a terminal capable of automatically performing numerical calculations and/or information processing in accordance with previously set or stored instructions, and its hardware includes, but is not limited to, microprocessors, application specific integrated circuits, programmable gate arrays, digital processors, and embedded devices. In some embodiments, the storage device 101 is used to store program code and various data. The storage device 101 can include read-only memory (ROM), random access memory (RAM), programmable read-only memory (PROM), erasable programmable read-only memory (EPROM), one time programmable read-only memory (OTPROM), electrically erasable programmable read only memory (EEPROM), compact disc read only memory (CD-ROM), or other optical disk storage, disk storage, magnetic tape storage, or any other computer-readable medium that can be used to carry or store data.

In some embodiments, the at least one processor 102 may include integrated circuits, such as a single packaged integrated circuit, or multiple integrated circuits with the same or different functional packages, including microprocessors, digital processing chips, graphics processors, and combinations of various control chips. The processor 102 can be a central processing unit (CPU), other general-purpose processors, digital signal processors (DSPs), application specific integrated circuits (ASICs), field programmable gate arrays (FPGAs). The processor 102 is the control unit of the electronic device 100, which executes various functions and processes data of the electronic device 100 by running or executing programs or modules stored in the storage device 101, and invoking data stored in the storage device 101. The storage device 101 stores program code, and the at least one processor 102 can call the program code stored in the storage device 101 to perform related functions. In an embodiment of the present disclosure, the storage device 101 stores a plurality of instructions that are executed by the at least one processor 102 to implement the particle detection method.

It is understood that the specific implementation of the electronic device 100 can be seen in the above embodiments and will not be discussed here.

The electronic device of the present disclosure can achieve the technical effect of the particle detection method by performing each step of the particle detection method. The implementation principle of the technical effect can refer to the relevant description of the particle detection method and will not be elaborated here.

The embodiment of the present disclosure also provides a storage medium. The storage medium stores computer instructions that, when run on a computing device, enable the computing device to execute the particle detection method provided by the embodiments.

The storage medium of the present disclosure can achieve the technical effect of the particle detection method by performing each step of the particle detection method. The implementation principle of the technical effect can refer to the relevant description of the particle detection method and will not be elaborated here.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A particle detection method comprising:

obtaining a detection image;

processing the detection image by filtering out noise and retaining the particle in the detection image to obtain a particle image;

processing the detection image by averaging the particle in the particle image to obtain a background image;

identifying an imaging of a particle in the detection image and obtaining a shadow region of the particle;

determining a maximum influence degree of the particle based on an influence degree of each pixel point in the shadow region; and obtaining size information of the particle based on the maximum influence degree of the particle;

wherein obtaining the size information of the particle based on the maximum influence degree of the particle, further comprises:

determining a projection distance and a focal ratio of a camera module, wherein the projection distance is a distance between a photosensitive element and a filter lens, and the focal ratio is a ratio of an equivalent focal length to an optical aperture; and obtaining the size information of the particle based on the projection distance, the focal ratio, and the maximum influence degree;

wherein determining the maximum influence degree of the particle based on the influence degree of each pixel point in the shadow region, comprises:

obtaining the influence degree of each pixel point in the shadow region based on grayscale values of each pixel point in the shadow region in the particle image and grayscale values of each pixel point in the shadow region in the background image; and taking a maximum value of the influence degree of each pixel point in the shadow region as the maximum influence degree of the particle.

2. The particle detection method of claim 1, wherein identifying the imaging of the particle in the detection image and obtaining the shadow region of the particle, further comprises:

identifying the imaging of the particle in the detection image and obtaining an initial region of the particle; and obtaining the influence degree of each pixel point in the initial region based on grayscale values of each pixel point in the initial region in the particle image and grayscale values of each pixel point in the initial region in the background image.

3. The particle detection method of claim 2, further comprising:

taking the initial region as the shadow region of the particle when there is a pixel in the initial region with the influence degree greater than a preset threshold.

4. An electronic device comprising:

a storage device; and at least one processor, wherein the storage device stores one or more programs, when executed by the at least one processor, the one or more programs cause the at least one processor to:

obtain a detection image;

process the detection image by filtering out noise and retaining the particle in the detection image to obtain a particle image;

process the detection image by averaging the particle in the particle image to obtain a background image;

identify an imaging of a particle in the detection image and obtain a shadow region of the particle;

determine a maximum influence degree of the particle based on an influence degree of each pixel point in the shadow region;

obtain size information of the particle based on the maximum influence degree of the particle;

determine a projection distance and a focal ratio of a camera module, wherein the projection distance is a distance between a photosensitive element and a filter lens, and the focal ratio is a ratio of an equivalent focal length to an optical aperture; and obtain the size information of the particle based on the projection distance, the focal ratio, and the maximum influence degree;

wherein the at least one processor is further caused to:

obtain the influence degree of each pixel point in the shadow region based on grayscale values of each pixel point in the shadow region in the particle image and grayscale values of each pixel point in the shadow region in the background image; and take a maximum value of the influence degree of each pixel point in the shadow region as the maximum influence degree of the particle.

5. The electronic device of claim 4, wherein the at least one processor is further caused to:

identify the imaging of the particle in the detection image and obtain an initial region of the particle; and obtain the influence degree of each pixel point in the initial region based on grayscale values of each pixel point in the initial region in the particle image and grayscale values of each pixel point in the initial region in the background image.

6. The electronic device of claim 5, wherein the at least one processor is further caused to:

take the initial region as the shadow region of the particle when there is a pixel in the initial region with the influence degree greater than a preset threshold.

7. A non-transitory storage medium having stored thereon instructions that, when executed by a processor of an electronic device, causes the processor to perform a particle detection method, wherein the method comprises:

obtaining a detection image;

process the detection image by filtering out noise and retaining the particle in the detection image to obtain a particle image;

process the detection image by averaging the particle in the particle image to obtain a background image;

identifying an imaging of a particle in the detection image and obtaining a shadow region of the particle;

determining a maximum influence degree of the particle based on an influence degree of each pixel point in the shadow region; and obtaining size information of the particle based on the maximum influence degree of the particle;

wherein obtaining the size information of the particle based on the maximum influence degree of the particle, further comprises:

determining a projection distance and a focal ratio of a camera module, wherein the projection distance is a distance between a photosensitive element and a filter lens, and the focal ratio is a ratio of an equivalent focal length to an optical aperture; and obtaining the size information of the particle based on the projection distance, the focal ratio, and the maximum influence degree;

wherein determining the maximum influence degree of the particle based on the influence degree of each pixel point in the shadow region, further comprises:

obtaining the influence degree of each pixel point in the shadow region based on grayscale values of each pixel point in the shadow region in the particle image and grayscale values of each pixel point in the shadow region in the background image; and taking a maximum value of the influence degree of each pixel point in the shadow region as the maximum influence degree of the particle.

8. The non-transitory storage medium of claim 7, wherein identifying the imaging of the particle in the detection image and obtaining the shadow region of the particle, further comprises:

identifying the imaging of the particle in the detection image and obtaining an initial region of the particle; and obtaining the influence degree of each pixel point in the initial region based on grayscale values of each pixel point in the initial region in the particle image and grayscale values of each pixel point in the initial region in the background image.

9. The non-transitory storage medium of claim 8, further comprising:

taking the initial region as the shadow region of the particle when there is a pixel in the initial region with the influence degree greater than a preset threshold.

* * * * *